United States Patent Office 3,681,163
Patented Aug. 1, 1972

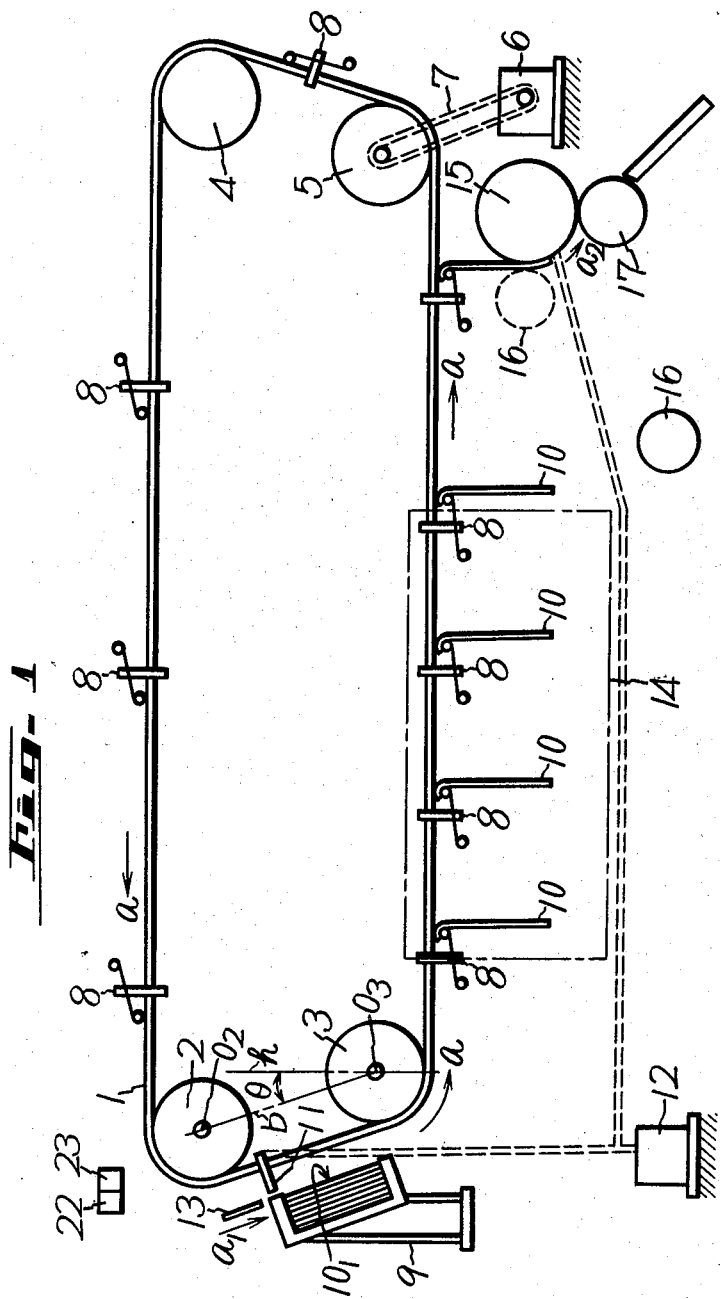

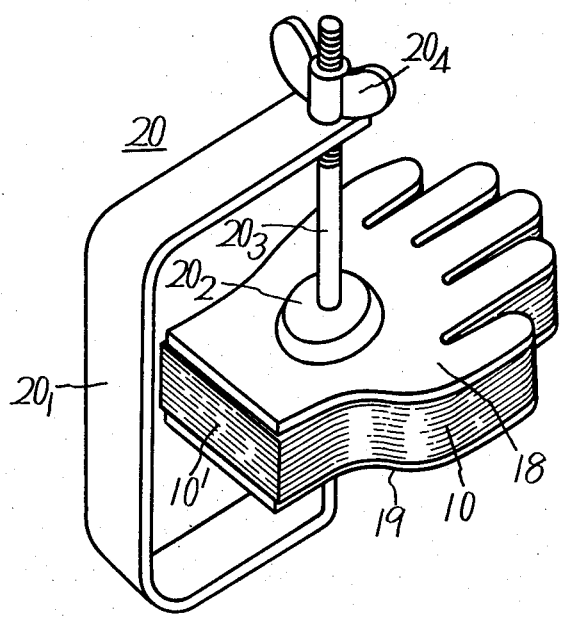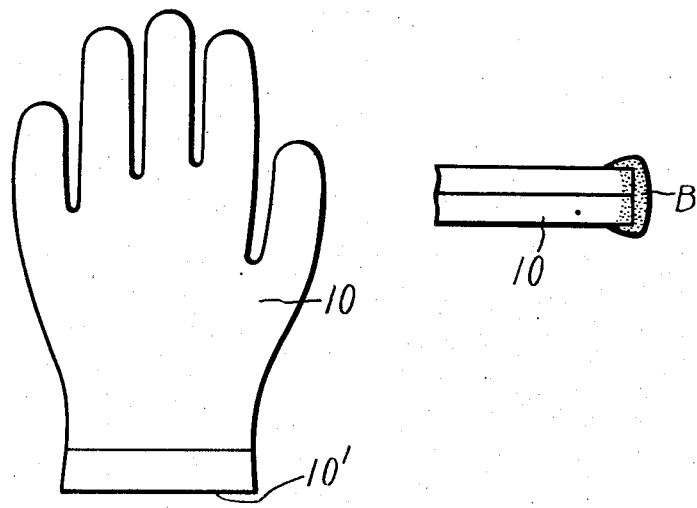

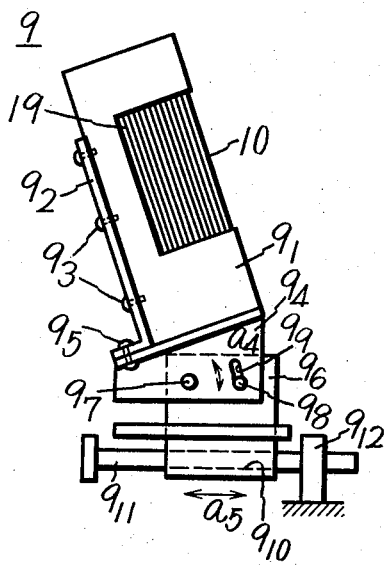
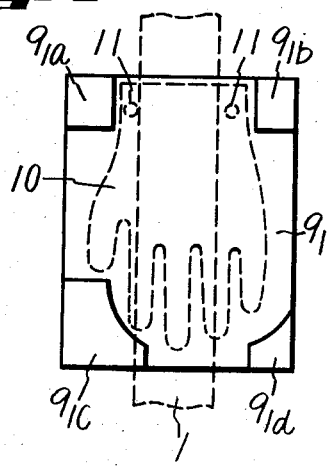
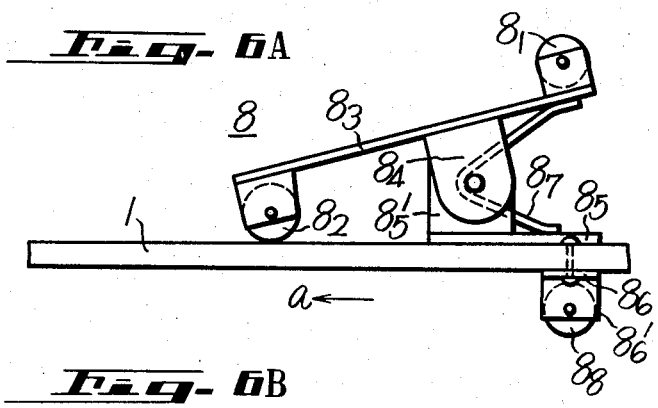
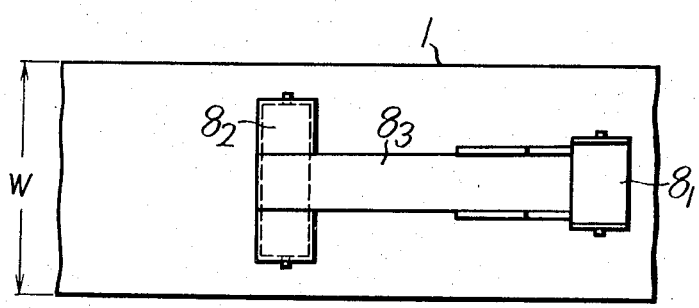

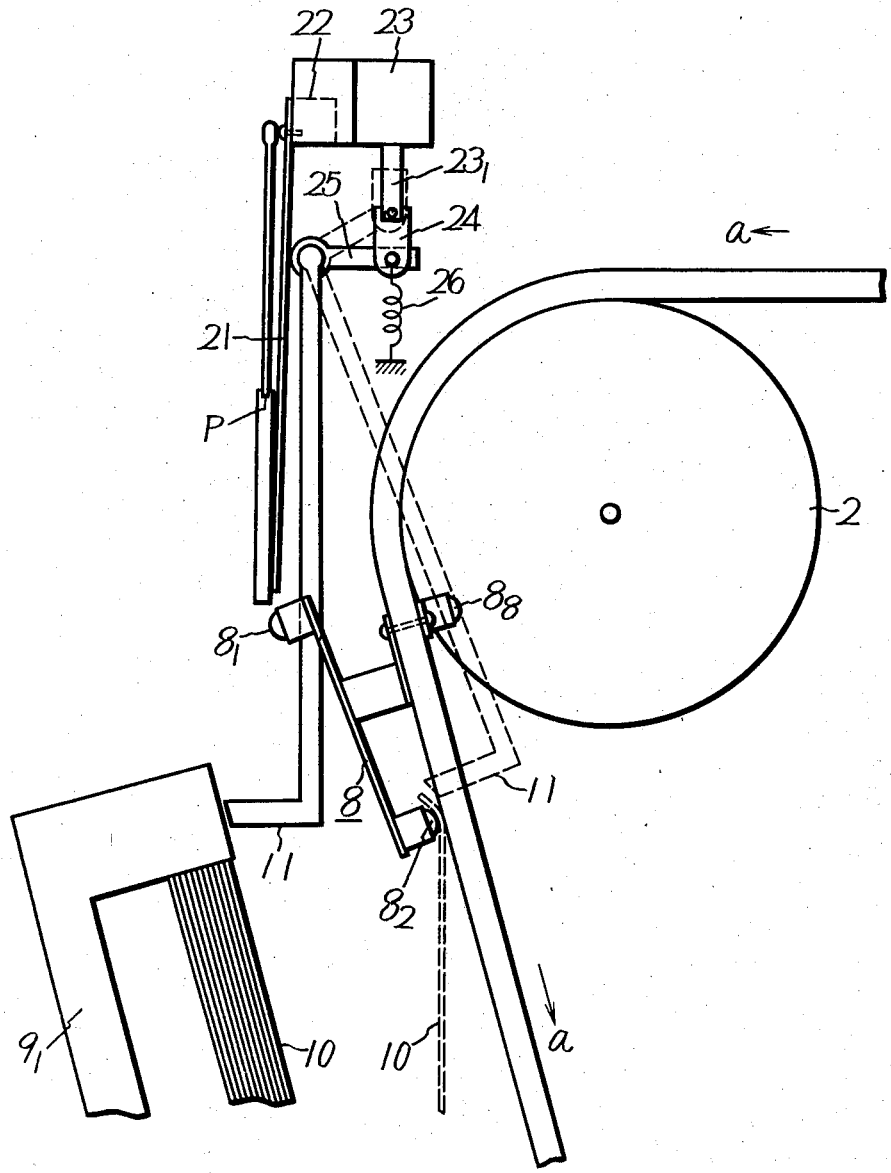

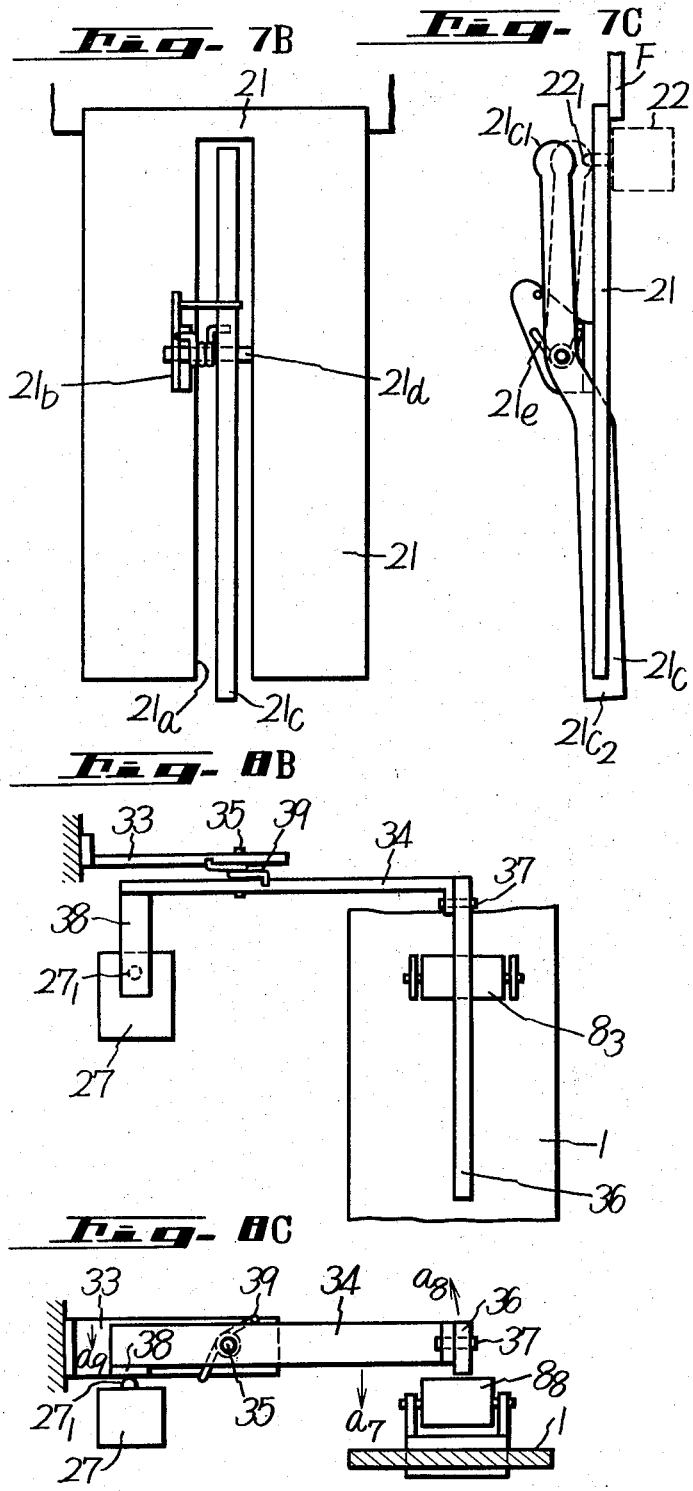

3,681,163
METHOD FOR APPLYING ADHESIVE TO MARGINAL EDGES OF FABRICS AND BONDING SAME
Hiroshi Ohashi, 54 Tsuragaoka, Ohi-machi, Iruma-gun, Saitama-ken, Japa
Filed June 3, 1969, Ser. No. 829,867
Claims priority, application Japan, July 22, 1968, 43/51,156; Apr. 30, 1969, 44/33,817
Int. Cl. B29h 7/04; B32b 7/14
U.S. Cl. 156—291                     3 Claims

ABSTRACT OF THE DISCLOSURE

A method for applying an adhesive to marginal edges of fabrics, in which stacked base fabrics are provided, each of the base fabrics being identical in configuration; said stacked base fabrics are clamped by clamping means comprising die plates disposed on the upper and lower sides of said fabrics, said die plates being substantially identical in shape to said base fabrics; an adhesive is applied to said base fabrics at marginal edges thereof; and said stacked base fabrics are removed two at a time and pressed together to seal at their edges.

BACKGROUND OF THE INVENTION

Field of the invention

This invention relates to an apparatus and a method for applying an adhesive to the marginal portions of textile goods to provide adhesion areas or to strengthen the edge structure to prevent fraying, and more particularly to an apparatus and a method for applying an adhesive to the marginal edges of base fabrics such as woven or knit fabrics used for making of bags and the like.

Description of the prior art

For providing adhesion areas on the marginal edges of fabrics or preventing fray of the fabrics from the edges, it has been the practice to hemstitch the edges of the fabrics by hand or by a sewing machine or to manually apply an adhesive to the edges when making many bags of the same shape, many layers of fabric are cut at the same time and an adhesive is applied to their marginal edges to join them in pairs at the marginal edges. Alternatively the fabric may be hemstitched in pairs. The joining and hemstitching is done manually which requires much time. Making gloves or the like having curved marginal edges requires skill and hence is low in working efficiency.

SUMMARY OF THE INVENTION

Accordingly, the principal object of this invention is to provide an apparatus and a method for applying an adhesive such as vinyl chloride, polyurethane resin or natural rubber on the marginal edges of textile goods such as woven fabrics, knit fabrics, tricot fabrics or the like to form adhesion areas or to strengthen the edge structure to prevent fraying.

BRIEF DESCRIPTION OF THE DRAWING

FIG. 1 is a schematic diagram generally showing an apparatus of this invention;

FIG. 2 is a schematic perspective view of a device for applying an adhesive to base fabric cake according to this invention;

FIG. 3A is a plan view showing one example of the base fabric depicted in FIG. 2;

FIG. 3B is an enlarged diagram showing the marginal edge of the base fabric to which the adhesive has been applied;

FIG. 4 is an enlarged side view of a support for base fabrics shown in FIG. 2;

FIG. 5 is a front view of one portion of the support depicted in FIG. 4;

FIGS. 6A and 6B are enlarged diagrams of a pincher being attached to a belt used in the apparatus shown in FIG. 1;

FIG. 7A is an enlarged side view of one portion of the apparatus depicted in FIG. 1;

FIGS. 7B and 7C are enlarged views of some portions of that shown in FIG. 7A;

FIGS. 8B and 8C are enlarged views of some portions of that shown in FIG. 8A.

DESCRIPTION OF THE PREFERRED EMBODIMENTS

Figure 8A:
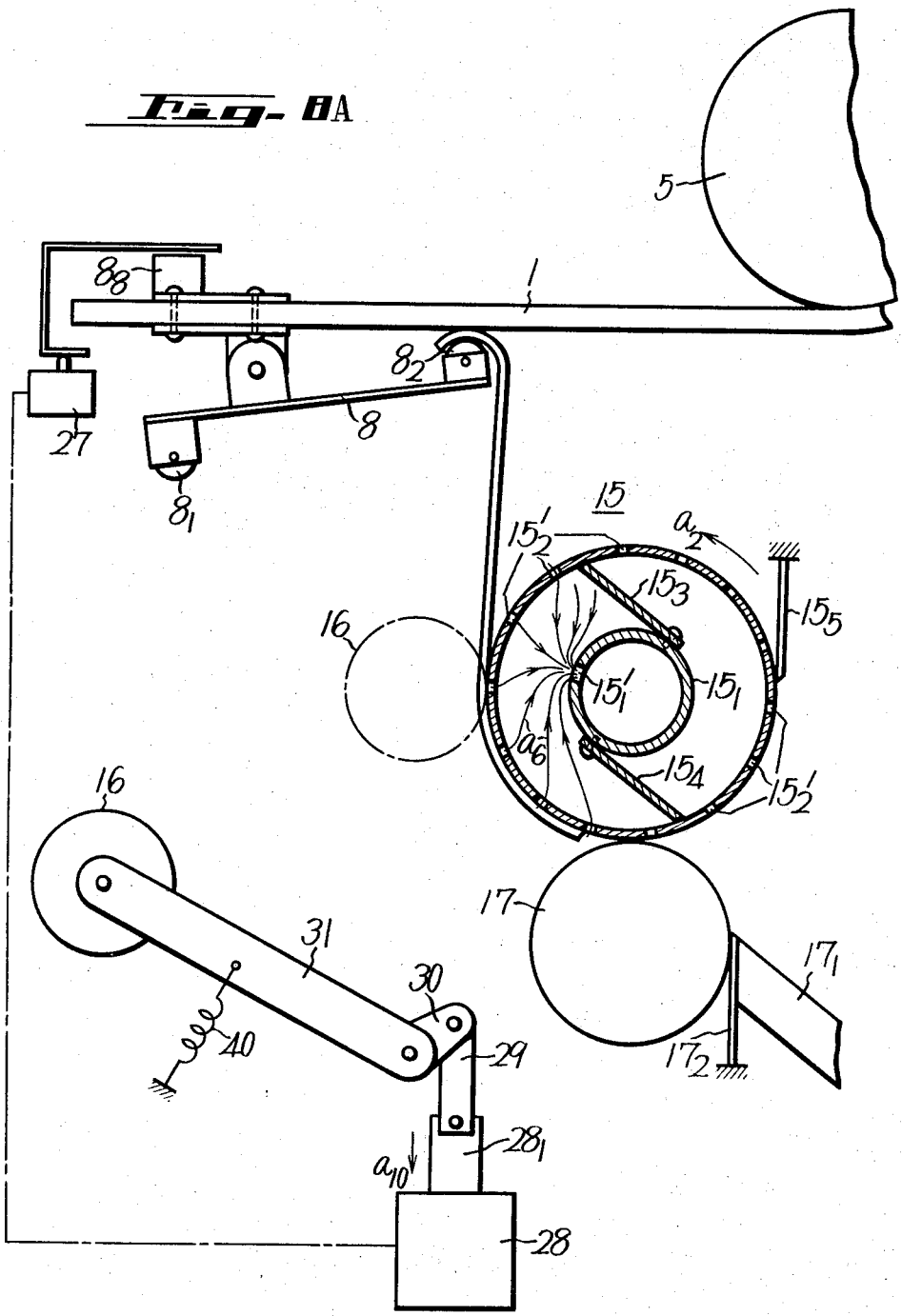
FIG. 8A is an enlarged side view of another portion of the apparatus depicted in FIG. 1.

Referring to FIG. 1 one example of this invention will hereinafter be described. In the figure reference numeral 1 indicates a belt and 2, 3, 4 and 5 rollers for rotatably supporting the belt 1. The rollers 2, 3, 4 and 5 are rotatably supported by suitable supports or frames, not shown. In the illustrated example the roller 5 is driven in the direction of arrow $a$ by, for example, a motor 6 through a belt 7 indicated by dotted lines. A plurality of pinchers 8 are mounted on the endless belt 1 substantially at the center thereof at predetermined intervals. The side view of the path of the belt 1 is trapezoidal as shown in FIG. 1 by suitably positioning supports of the rollers 2, 3, 4 and 5. An angle $\theta$ formed by a straight line $b$ joining the center $O_2$ of the roller 2 with that $O_3$ of the roller 4 relative to a vertical line $h$ is selected to be less than 90 degrees for the reasons described later.

Reference numeral 9 indicates a fabric cake setting table on which are placed a plurality of stacked glove cutouts or base fabric members 10 made of, for example, knit fabric material in the same shape which have been coated over the predetermined portions thereof with an adhesive. On the table 9 the base fabric members 10 are set in such a manner that the surface $10_1$ of the uppermost base fabric member 10 lies substantially parallel with the surface of the belt 1 running between the rollers 2 and 3. Reference numeral 11 designates means for bringing a required number of the base fabric members 10 on the table 9 into engagement with the belt 1. In the illustrated example the above means consists of a pair of suction pipes, the openings of which are disposed opposite the surface $10_1$ of the base fabric member 10 and the other ends of which are interconnected by pipes as indicated by broken lines in the figure to a suction unit 12 such, for example, as a vacuum pump.

In the case of making gloves or the like, a thin sheet (a spacer) 13 which is impervious such as a thin metal plate is inserted between every other base fabric 10 to a point a little past the suction pipe 11 (about 20 mm.) in the direction indicated by an arrow $a_1$. It is convenient for insertion of the sheets 13 if the surface of the base fabric cake 10 is inclined at an angle of approximately $\theta (0° < \theta < 90°)$ relative to a vertical direction. Upon actuation of the suction unit 12 under such conditions, the upper portions of two adjacent base fabrics 10 are attracted to the pipes 11 from the surface of the fabric cake due to suction of the pipes 11. Then, a switching means 22 is turned on to feed a current from a power source (not shown) to a solenoid 23 to actuate it to bring the open end portions of the pipes 11 into the contact position flush with the outer surface of the belt 1. In this case each pincher 8 holds the base fabrics 10 at their upper ends while gripping them between the pincher and the belt 1. This operation is continuously achieved by each of the pinchers 8, so that the base fabrics 10 are sequentially held at their upper ends in pairs onto the belt 1 and are transported by the belt 1 in a direction indicated by the arrow $a$. Consequently, the base fabrics 10 are transported by the belt 1 down to its lower portion as illustrated in FIG. 1.

In FIG. 1 reference numeral 14 indicates means such, for example, as a hot air blower for drying an adhesive applied to the base fabrics 10. The drier means 10 is disposed under the belt 1, that is, between the rollers 3 and 5 in such a manner as to surround the belt 1 and the base fabrics 10 hung down from the belt 1.

The base fabrics 10 having passed the drier 14 are attracted onto the surface of a roller 15, the construction and operation of which will be later described in detail, disposed below the belt 1. When the base fabrics 10 have been attracted at their lower end portions onto the roller 15, a switch described later is actuated to bring a roller 16 to such a position as indicated by a broken line to press the lower end portions of the base fabrics 10 against the roller 15. Thus, when the roller 15 is driven by a drive source (not shown) in a direction indicated by an arrow $a_2$, the base fabrics 10 are pulled down while being gripped between the rollers 15 and 16 and the upper end portions of the base fabrics 10 are disengaged from the pincher 8 and then are pressed together between the rollers 15 and 17, so that each pair of base fabrics 10 are bonded together firmly at their marginal edges where the adhesive has been applied.

The foregoing has outlined the construction, arrangement and operation of the device of this invention. A detailed description will hereinbelow be given of each of the principal parts of the device.

FIG. 2 illustrates one example of means for applying an adhesive such as vinyl chloride, natural rubber or polyurethane resin on predetermined marginal edges of the glove cutouts mounted on the table 9. That is, many base woven or knit fabrics 10 cutout in the same shape to have a space between adjacent finger portions as shown in FIG. 3A are bound together in layers and are clamped by, for example, a clamper 20 with die plates 18 and 19 disposed on the upper and lower sides of the cutout layers. The die plates 18 and 19 are substantially identical in shape with the glove cutouts 10 but their marginal edges protrude from the die plates 18 and 19 substantially uniformly. Then, the glove cutouts thus stacked together are dipped into an adhesive solution so as to apply the adhesive to the marginal edges of the glove cutouts 10 except their sleeve portions 10'. The clamper 20 consists of a substantially C-shaped metal plate $20_1$ and a rod $20_3$ having screw threads at one end and a pad $20_2$ at the other end. As shown in FIG. 2, the glove cutouts stacked in layers are disposed between free ends of the metal plate $20_1$ and the rod $20_3$ is inserted into a hole bored through the plate $20_1$ in a manner to press the pad $20_2$ against the die plate 18 and thumbscrew $20_4$ is screwed onto the rod $20_3$ projecting upwardly from the plate $20_1$. The cutouts are firmly clamped together between one end of the plate $20_1$ and the pad $20_2$ by clamping the thumbscrew $20_4$. Then, the glove cutouts are taken out from the adhesive solution and excess adhesive is removed, after which, for example, the upper die plate 18 is removed and the cutouts mounted on the die plate 18 is placed on a support deck $9_1$ (described later) of the table 9. In this case the adhesive applied to the marginal edges of the base fabrics 10 somewhat penetrates into the fabrics as shown in FIG. 3B, and in the case of a pair of base fabrics as shown the adhesive uniformly covers their marginal edges as depicted in the figure.

FIG. 4 is an enlarged side view of the principal part of the table 9 and FIG. 5 a plan view of the support deck $9_1$ (made of wood) of the table 9 on which the cutouts are directly mounted. Referring now to these figures, the construction and operation of the table 9 will hereinbelow be described in detail. As depicted in FIG. 4, the support deck $9_1$ is fixed to a frame $9_2$, for example, by means of screws $9_3$. A support member $9_4$ is fixed to the frame $9_2$, for example, by screws $9_5$ so that the support deck $9_1$ is firmly fixed by the frame $9_2$ and the support member $9_4$. The support member $9_4$ is supported, in turn, by a support member $9_6$. In this case the support member $9_4$ is pivoted to the support member $9_6$, for example, by a screw $9_7$, while the other screw $9_8$ is screwed into the support member $9_6$ through an arc-shaped groove $9_9$ formed in the support member $9_4$. Accordingly, the support deck $9_1$ can be suitably inclined relative to the belt running between the rollers 2 and 3 by turning the support member $9_4$ about the screw $9_7$ in a direction of an arrow $a_4$ after the screw $9_8$ has been loosened. Further, a female screw $9_{10}$ is formed in the support member $9_6$ at the lower portion and a male screw $9_{11}$ is screwed into the female screw $9_{10}$ and is rotatably supported at free ends by fixed parts $9_{12}$. Consequently, rotation of the male screw $9_{11}$ leads to movement of the support deck $9_1$ in a horizontal direction or in a direction of an arrow $a_5$ so as to enable suitable adjustment of the distance between the support deck $9_1$ and the belt 1. Namely, the position of the support deck $9_1$ relative to the pipes 11 can be adjusted in accordance with the number of the glove cutouts 10 bound together.

The cutouts 10 are mounted on the support deck $9_1$ in such a manner as indicated by dotted line in FIG. 5. Namely, the support deck $9_1$ is substantially large enough to encompass the cutouts 10 and has projections $9_{1a}$, $9_{1b}$, $9_{1c}$ and $9_{1d}$ at four corners, and the projections are configured so that the cutouts 10 are snugly fitted inside of the projections. The belt 1 lies at a position indicated by a broken line in FIG. 5 and the openings of the suction pipes 11 are disposed opposite the upper portion of the cutouts on both sides of the belt 1 as indicated by broken lines in the figure. Accordingly, the cutouts 10 are attracted at two positions by the suction of the pipes 11 and are brought onto the belt 1, so that although the cutouts are thin, they are attracted and brought into contact with the belt 1 with practically no deformation.

In FIG. 6A there is illustrated on a greatly enlarged scale one example of the aforementioned pincher 8 when attached to the belt 1 between the rollers 2 and 4 and seen from one side. A detailed description will be given in connection with the construction of one example of the pincher. Reference numerals $8_1$ and $8_2$ designate rollers which are rotatably supported on both ends of an elongated plate $8_3$. In the present example the roller $8_2$ is adapted to make contact with the belt 1. The plate $8_3$ has fixed thereto a lug $8_4$ at a position further to the roller $8_1$ than the center of the plate. While a pair of bases $8_5$ and $8_6$ are fixed by, for example, a screw to the belt 1 on its both surfaces substantially at the center of the belt in its widthwise direction (reference to FIG. 6B). In this case, the base $8_5$ is mounted on the upper surface of the belt 1 (on the outside of the endless or ring-shaped belt) and the base $8_6$ is on the underside of the belt (on the inside of the belt). The lug $8_4$ is pivoted to a portion $8_5'$ of the base $8_5$ standing up in a direction perpendicular to the belt 1. The roller $8_2$ lies ahead of that $8_1$ with respect to a transfer direction $a$ of the belt 1 and a spring $8_7$ is disposed between the base $8_5$ and the end of the plate $8_3$ carrying the roller $8_1$ as shown in the figure to bias the plate $8_3$ to lift up the roller $8_1$ and to press the roller $8_2$ against the belt 1. A roller $8_8$ is rotatably attached to a portion $8_6'$ of the base $8_6$ extending down in a vertical direction.

The axial directions of the aforementioned rollers $8_1$ and $8_2$ lie substantially parallel to the widthwise direction of the belt as depicted in FIG. 6B and the length of the roller $8_2$ in its axial direction is selected to be a little smaller than the width W of the belt 1. Further, the rollers 2, 3, 4 and 5 have formed therein grooves, though not shown, which permit the roller $8_8$ and its support to run past the rollers 2, 3, 4 and 5.

Turning to FIGS. 7A, 7B and 7C, a description will be given of the construction and operation of the pincher 8 for picking up the base fabrics 10 in pairs onto the belt 1. When the pincher 8 has not yet reached a predetermined position, the suction pipe 11 lies at a position indicated by solid lines in FIG. 7. When the pincher 8 has reached the predetermined position, the roller $8_1$, which is biased by the spring $8_7$ to go away from the belt 1, is brought into engagement with one portion of a plate-like arm 21 attached at one end to a stationary part (a frame F) and is thereby pushed to the belt 1, disengaging the other roller $8_2$ from the belt 1.

As clearly shown in FIG. 7B, the plate-like arm 21 has formed therein a slit 21a along substantially the entire length of the arm at the center thereof and a lug 21b is fixedly mounted on the arm 21 substantially at the center thereof on one side of the slit 21a. Reference numeral 21c indicates a lever, which is pivoted at the center to the lug 21b by a pin 21d so as to be rotatable in the slit 21a of the arm 21. In addition, a spring 21e is provided between the pin 21d and the lever 21c and one end $21c_1$ of the lever 21c is always held out of contact with an actuating button $22_1$ of a micro switch 22 and the other end $21c_2$ projects from the plate-like arm 21 toward the belt 1. When the roller $8_1$ engages the arm 21, it simultaneously engages the lever 21c projecting from the arm 21 toward the belt 1, with the result that the end $21c_1$ of the lever 21c presses the actuating button $22_1$ of the micro switch 22 as indicated by dotted lines in FIG. 7C. The switch 22 excites a solenoid 23. A plunger $23_1$ of the solenoid 23 has pivoted thereto one end of a connecting rod 24 to hold the suction pipe 11 at a position indicated by full lines in FIG. 7A when the solenoid 23 is in its non-excited condition. Further, a spring 26 is stretched between the other end of the connecting rod 24 and a stationary part. The other end of the connecting rod 24 has pivoted thereto one end of a lever 25, the other end of which is, in turn, rotatably supported together with the other end of the suction pipe 11.

When one end of the arm 21 has begun to engage with the roller $8_1$ to bring the roller $8_2$ out of contact with the belt 1, the lever 21c also makes contact with the roller $8_1$ to close the switch 22 with the other end of the lever 21c, so that the plunger $23_1$ is pulled back and the connecting rod 24 coupled with the plunger $23_1$ is also pulled back against the biasing force of the spring 26 stretched between the other end of the rod 24 and the stationary part. Accordingly, the lever 25 and the suction pipe 11 are turned as indicated by broken lines in FIG. 7A and, as a result of this, the upper end portion of the base fabrics 10 attracted to the openings of the pipes 11 is brought into contact with the belt 1. At this time, the roller $8_1$ is disengaged from the arm 21, and hence the roller $8_2$ is again engaged with the belt 1 by the spring $8_7$, clamping the upper end portion of the base fabric 10 between the roller $8_2$ and the belt 1. Thus the base fabric 10 is suspended from the belt 1 as indicated by broken lines. Since the roller $8_1$ is disengaged from the lever 21c at this time, the end $21c_1$ of the lever 21c operating the switch 22 is brought out of contact with the button $22_1$ of the switch 22 by the spring 21e and the switch 22 turns off the solenoid 23. Thus, the pipe 11 is again returned to the position indicated by full lines.

While the belt 1 is moved in the direction of the arrow a, the base fabrics 10 held by the belt 1 and the pincher 8 passes through the drier 14 to dry the adhesive applied to the marginal edges of the fabrics.

Referring now to FIG. 8, a description will be given in connection with a final stage of the manufacturing process in which the pair of base fabrics 10 are removed from the belt 1 after the adhesive has been dried and the fabrics 10 are firmly joined at the edges to provide a glove.

The roller 15 is of an airtight dual construction as depicted in FIG. 8A. The roller 15 consists of a fixed central hollow roller $15_1$ and an outer rotary roller $15_2$ surrounding it. The hollow roller $15_1$ is fixedly supported by a frame, though not shown, and is coupled by an intercommunicating pipe with the suction unit 12, though not shown. The space defined by the hollow rollers $15_1$ and $15_2$ is divided into two independent rooms by partition walls $15_3$ and $15_4$ airtightly fixed at one end to, for example, the roller $15_1$. The hollow roller $15_1$ has bored therein an aperture $15_1'$ and the roller $15_2$ has many apertures formed therein uniformly over the entire surface thereof. Further, the roller $15_2$ is coupled with a drive source, for example, a motor 6 by suitable means, though not shown, and is thereby driven in a direction of an arrow $a_2$.

When the lower free ends of the base fabrics 10 having passed through the drier 14 due to movement of the belt 1 approaches the apertures $15_2'$ of the roller $15_2$ the portion of the base fabric 10 facing the roller $15_2$ is attracted on to the surface of the roller $15_2$ by the suction of the aperture $15_1'$ of the roller $15_1$ and those $15_2'$ of the roller $15_2$ (in the direction of arrows $a_6$). A switch 27 is arranged to be actuated by the roller $8_8$ of the pincher 8 at this time. Namely, as illustrated in FIGS. 8B and 8C, one end of a bracket 33 is fixed to a fixed part or a frame and a lever 34 is pivoted by a pin 35 to the bracket 33 substantially at the central portion thereof. A rod 36 is fixed to one end of the lever 34 by, for example, a pin 37 and one end of an elongated plate-like rod 38 is fixed to the other end of the lever 34. Further, a spring 39 is stretched by the pin 35 between the lever 34 and the bracket 33 and is adapted so that the end of the lever 34 having the rod 36 is usually biased in a direction of an arrow $a_7$ in FIG. 8C, that is, in a direction toward the surface of the belt 1. Consequently, the free end of the plate-like rod 38 fixed at one end to the other end of the lever 34 is usually held out of contact with an actuating button $27_1$ of the micro switch 27. However, when the base fabrics 10 are attracted on to the roller 15 as above described, the roller $8_8$ moves into contact with the rod 36 to push it in a direction opposite to that of the arrow $a_7$, turning the end of the lever 34 having the rod 36 about the pin 35 in a direction of an arrow $a_8$ (in FIG. 8C) to lower the other end of the lever 34 in a direction of an arrow $a_9$ (in FIG. 8C). Accordingly, the button $27_1$ of the switch 27 is pushed by the plate-like rod 38 to turn on the switch 27 to feed a current from a power source (not shown) to the solenoid 28 supported to the stationary part, so that the plunger $28_1$ is pulled in a direction of an arrow $a_{10}$ in FIG. 8A. A lever 29 pivoted to the plunger $23_1$ a lever 30 pivoted to the lever 29 and an arm 31 pivoted to the lever 30 are actuated by reciprocating motion of the plunger $23_1$ to bring an idler 16 pivoted to the free end of the arm 31 to a position indicated by broken lines in FIG. 8A, so that the base fabrics 10 are held between the roller 15 and the idler 16. With the rotation of the roller 15 in the direction of the arrow $a_2$, the base fabrics 10 are pulled downward and the free ends of the base fabrics 10 held onto the belt 1 by the roller $8_2$ of the pincher 8 are disengaged therefrom and are brought between the roller 15 and the roller 17 rotatably supported, thereby to be pressed together, where the pair of base fabrics 10 are firmly joined together at the marginal portions, thus providing a complete glove.

When the belt 1 has further rotated to disengage the roller $8_8$ of the pincher 8 from the rod 36, the end of the lever 34 carrying the rod 36 is turned by the spring 39 in a direction reverse to that of the arrow $a_8$ to turn the other end in a direction opposite to that of the arrow $a_9$. As a result of this, the plate-like rod 38 becomes disengaged from the button $27_1$ to turn off the switch 27 to cut off the power supply to the solenoid 28. At this time, the roller 16 is returned to the position indicated by full lines in FIG. 8A by the force of the spring 40 stretched between the arm 31 and the stationary part.

In FIG. 8A reference numerals 17₂ and 15₅ designate knives which are used for scraping off the gloves, the adhesive or the like from the rollers 15 and 17 when they have adhered thereto. Reference numeral 17 indicates a table for receiving the completed gloves.

With the present invention described above, the device is relatively simple in construction and reliable in operation and enables automatic mass-production of gloves without necessity of manual operations. In this case the finished gloves may be used as they are but if the bonded seam is undesirable, they may be turned inside out.

Although the present invention has been described as applied to the making of gloves, it is also possible to prepare base fabrics each having applied thereto an adhesive over a predetermined width of the marginal edge by selecting the shape of the base fabrics, stacking them in the manner described with FIG. 2, applying the adhesive, inserting the spacer plate 13 between adjacent base fabrics instead of every two of them, mounting the base fabrics stacked as a unit on the aforementioned table 9 and actuating the devices described above. This prevents fraying of knit or woven fabrics at the cut edges and mass-production can be easily achieved with substantially no manual operation.

Further, this invention facilitates the making of bags or the like by placing two base fabrics to which an adhesive has been applied on their marginal edges and by pressing them together with, for example, two rollers.

It will be apparent that many modifications and variations may be effected without departing from the scope of the novel concepts of this invention.

I claim as my invention:

1. A method for applying an adhesive to marginal edges of fabrics comprising the steps of providing stacked base fabrics cutouts from base fabric sheets in a desired shape, each of said stacked base fabrics being the same in configuration, clamping said stacked base fabrics with die plates disposed on the upper and lower sides of said stacked base fabrics, said die plates conforming substantially to the shape of said base fabrics, applying an adhesive to marginal edges of said stacked bace fabrics except at the portions corresponding to openings in the finished article by dipping said stacked base fabrics with said die plates into an adhesive solution, removing said stacked base fabrics two at a time, and pressing said removed two base fabrics together to seal their edges together where said adhesive has been applied to form said finished article.

2. The method of claim 1 comprising placing sheets of impervious material between alternate layers of said stacked base fabrics.

3. A method for applying an adhesive to marginal edges of fabrics by dipping to strengthen the edge structure of the fabrics to prevent fraying comprising the steps of stacking many fabrics of a predetermined shape, applying an adhesive to the marginal edges of the fabrics over a predetermined width, removing a pair of the fabrics from the stack at a time, drying said fabrics, transporting said fabrics by belt means, and pulling the pairs of fabrics from the belt means and pressing said removed pairs of fabrics together to seal their edges together to form finished articles.

References Cited

UNITED STATES PATENTS

| | | | |
|---|---|---|---|
| 1,437,505 | 12/1922 | Fargo | 117—44 |
| 1,470,282 | 10/1923 | Newman | 117—44 X |
| 1,482,090 | 1/1924 | Overbury | 117—44 |
| 1,624,379 | 4/1927 | Abbott | 117—45 A |
| 1,827,871 | 10/1931 | Frost | 30—346.53 |
| 2,000,226 | 5/1935 | Fry | 117—44 |
| 2,530,026 | 11/1950 | Muerch | 118—423 X |
| 2,826,167 | 3/1958 | Cohn et al. | 117—113 X |
| 2,840,117 | 6/1958 | Scruggs | 161—86 X |
| 3,416,174 | 12/1968 | Novitske | 117—113 X |

ROBERT F. BURNETT, Primary Examiner

R. L. MAY, Assistant Examiner

U.S. Cl. X.R.

117—44, 48, 113; 118—503; 156—292